Figure 1:
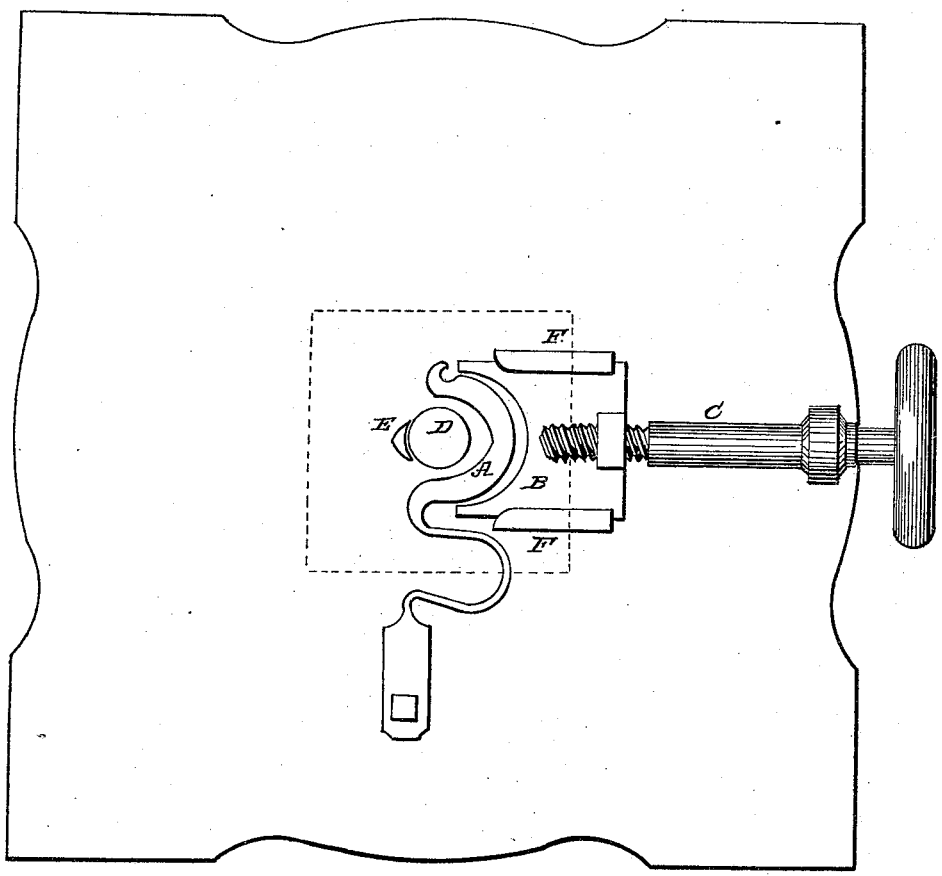

GRADER & COWAN.
Feed Regulator for Grain Mills.

No. 12,096.  Patented Dec. 19, 1854.

UNITED STATES PATENT OFFICE.

GEO. W. GRADER AND BENJ. F. COWAN, OF MEMPHIS, TENNESSEE.

GRAIN-MILL.

Specification of Letters Patent No. 12,096, dated December 19, 1854.

*To all whom it may concern:*

Be it known that we, GEORGE W. GRADER and BENJAMIN F. COWAN, of Memphis, in the county of Shelby and State of Tennessee, have invented a new and useful Improvement on a Machine for Grinding Grain; and we do hereby declare that the following is a full, clear, and exact description of the construction and operation of the same, reference being had to the annexed drawings, making a part of this specification, in which—

Figure 1 is a plan of the bed of the hopper, showing also the plan of the adjusting screw with the slide attached, the feed spring, the top of the spindle with the eccentric jut attached to its side. Fig. 2 is an elevation of the same with a portion of the frame attached.

The like letters refer to like parts.

A is the feeding spring.

B is the slide attached to the adjusting screw C.

D is the head of the spindle, to which is attached the eccentric jut E.

F are the slide keepers.

G, Fig. 2, is the hopper.

H, Fig. 2, are the stones.

K, Fig. 2, is the edge of the case of the stones.

I, Fig. 2, shows the continuation of the spindle.

J, Fig. 2, is the pulley frame with which the mill is set in action.

The dotted lines on the plan, Fig. 1, show the plan of bottom of the hopper.

The nature of our invention consists in the spring and jut as shown in the drawings.

We construct our feeder in such a manner that the opening through which the grain falls to the stones is enlarged or contracted by a slide which is operated upon by an adjusting screw. We then adjust a spring to the opening, which while it fits the opening, it at the same time passes around the spindle but does not come in contact with it. We then fix a jut in the side of the spindle, projecting sufficiently to come in contact with the concave side of the spring, and as the spindle revolves it operates eccentrically on the spring thereby keeping the spring in motion, and preventing the grain from choking the entrance to the stones, and giving it a regular supply.

What we claim and desire to secure by Letters Patent as our invention is—

Regulating the feed by the combination of the spring A and the eccentric jut E in the manner herein set forth.

GEORGE W. GRADER.
BENJAMIN F. COWAN.

Witnessed by—
DAVID W. MUNROE,
GEORGE BLUM.